(12) United States Patent
Ikeuchi et al.

(10) Patent No.: US 12,498,271 B2
(45) Date of Patent: Dec. 16, 2025

(54) TEMPERATURE ABNORMALITY DETECTION DEVICE

(71) Applicant: OMRON Corporation, Kyoto (JP)

(72) Inventors: Ryo Ikeuchi, Otsu (JP); Koji Takatori, Moriyama (JP); Takahiro Nakamura, Ritto (JP); Hironori Ogawa, Kyoto (JP); Tadahiko Ogawa, Ritto (JP); Akira Takaishi, Moriyama (JP)

(73) Assignee: OMRON CORPORATION, Kyoto (JP)

( * ) Notice: Subject to any disclaimer, the term of this patent is extended or adjusted under 35 U.S.C. 154(b) by 628 days.

(21) Appl. No.: 17/603,417

(22) PCT Filed: Feb. 21, 2020

(86) PCT No.: PCT/JP2020/007091
§ 371 (c)(1),
(2) Date: Oct. 13, 2021

(87) PCT Pub. No.: WO2020/213256
PCT Pub. Date: Oct. 22, 2020

(65) Prior Publication Data
US 2022/0214220 A1 Jul. 7, 2022

(30) Foreign Application Priority Data
Apr. 16, 2019 (JP) ................. 2019-077927

(51) Int. Cl.
*G01J 5/00* (2022.01)
*G01J 5/02* (2022.01)
(Continued)

(52) U.S. Cl.
CPC ............... *G01J 5/0096* (2013.01); *G01J 5/00* (2013.01); *G01J 5/027* (2013.01); *G01J 5/046* (2013.01); *G01J 5/56* (2013.01); *H02B 1/32* (2013.01)

(58) Field of Classification Search
CPC .......... G01J 5/0096; G01J 5/027; G01J 5/046; G01J 5/56; G01J 5/0205; G01J 5/041;
(Continued)

(56) References Cited

U.S. PATENT DOCUMENTS 5,793,522 A * 8/1998 Brun ..................... G01J 5/0875
359/903
10,775,978 B2 * 9/2020 Curiel Montoya .... G01R 31/00
(Continued)

FOREIGN PATENT DOCUMENTS

| JP | 2009076956 A | * | 4/2009 |
| JP | 2016038277 A | | 3/2016 |
| JP | 2019045192 A | | 3/2019 |

OTHER PUBLICATIONS

International Search Report for International Application No. PCT/JP2020/007091; Date of Mailing, Apr. 28, 2020.
(Continued)

*Primary Examiner* — John E Breene
*Assistant Examiner* — Janice M Soto
(74) *Attorney, Agent, or Firm* — CANTOR COLBURN LLP (57) ABSTRACT

A temperature abnormality detection device includes a plurality of infrared temperature sensors respectively capable of detecting temperature in a different detection area of an equipment, and a device body including a temperature abnormality determination unit that determines that the temperature in the detection area detected by each of the plurality of infrared temperature sensors is abnormal when
(Continued)

the temperature in the detection area is higher than a reference temperature. The plurality of infrared temperature sensors is connected to each other by crossover wiring.

16 Claims, 6 Drawing Sheets

(51) Int. Cl.
*G01J 5/04* (2006.01)
*G01J 5/56* (2006.01)
*H02B 1/32* (2006.01)

(58) Field of Classification Search
CPC .... G01J 5/10; H02B 1/32; H02B 3/00; H02B 13/065
See application file for complete search history.

(56) References Cited

U.S. PATENT DOCUMENTS

| | | | |
|---|---|---|---|
| 2010/0044567 A1* | 2/2010 | Brandt | G01J 5/0804 250/334 |
| 2013/0250102 A1 | 9/2013 | Scanlon et al. | |
| 2016/0187202 A1* | 6/2016 | Miller | G01J 5/025 29/834 |
| 2017/0089763 A1* | 3/2017 | Freer | G01R 19/0092 |

OTHER PUBLICATIONS

PCT Written Opinion of the International Searching Authority for International Application No. PCT/JP2020/007091; Date of Mailing, Apr. 28, 2020.
EPO Extended European Search Report for corresponding EP Application No. 20792043.0; Issued on Dec. 19, 2022.

* cited by examiner

TEMPERATURE ABNORMALITY DETECTION DEVICE

CROSS REFERENCE TO RELATED APPLICATIONS

This is the U.S. national stage of application No. PCT/JP2020/007091, filed on Feb. 21, 2020. Priority under 35 U.S.C. § 119(a) and 35 U.S.C. § 365(b) is claimed from Japanese Application No. 2019-077927, filed Apr. 16, 2019, the disclosure of which is also incorporated herein by reference.

TECHNICAL FIELD

The present disclosure relates to a temperature abnormality detection device that detects a temperature abnormality in equipment disposed in a panel.

BACKGROUND ART

PTL 1 discloses an electric facility temperature monitoring device. The electric facility temperature monitoring device includes two temperature detectors each disposed a cubicle in which an electric facility is housed. Each of the temperature detectors is held by a holding unit together with a lens.

CITATION LIST

Patent Literature

PTL 1: JP 2016-38277 A

SUMMARY OF INVENTION

Technical Problem

In the electric facility temperature monitoring device, each temperature detector is connected in parallel to a controller. Therefore, with a structure where each temperature detector and the controller are connected by wiring, when a position where each temperature detector is disposed is away from the controller or a third temperature detector is added, the amount of wiring increases, and it may be difficult to reduce a size.

It is, therefore, an object of the present disclosure to provide a temperature abnormality detection device that is compact in size and is capable of detecting a temperature abnormality over a wide range.

Solution to Problem

A temperature abnormality detection device that detects a temperature abnormality in equipment disposed in a panel, includes:

a plurality of infrared temperature sensors each capable of detecting temperature in a mutually different detection area of the equipment; and a device body including a temperature abnormality determination unit that determines that the temperature in the detection area detected by each of the plurality of infrared temperature sensors is abnormal when the temperature in the detection area is higher than a reference temperature, wherein the plurality of infrared temperature sensors is connected to each other by crossover wiring.

Advantageous Effects of Invention

According to the temperature abnormality detection device, the plurality of infrared temperature sensors are connected to each other by the crossover wiring. With such a configuration, an amount of wiring in the panel can be reduces. Thus, it is possible to provide a temperature abnormality detection device that is compact in size and is capable of detecting a temperature abnormality over a wide range.

DESCRIPTION OF EMBODIMENTS

Hereinafter, a description will be given of an example of the present disclosure with reference to the accompanying drawings. Note that, in the following description, terms representing specific directions or positions (for example, terms including "up", "down", "right", and "left") will be used as necessary, but the use of these terms is intended to facilitate understanding of the present disclosure with reference to the drawings, and the technical scope of the present disclosure shall not be limited by the meanings of the terms. Further, the following description shows merely an example in nature and is not intended to limit the present disclosure, applications of the present disclosure, or uses of the present disclosure. Furthermore, the drawings are schematic drawings, and ratios between dimensions are not necessarily equal to the actual ratios.

Figure 1:
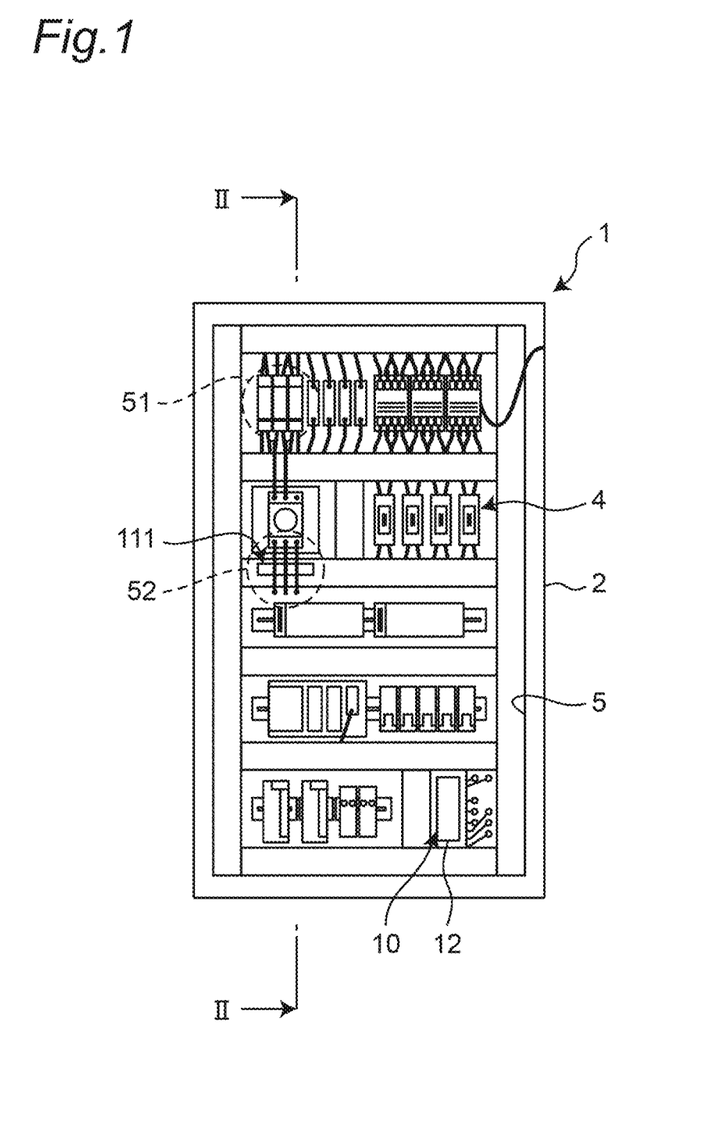
FIG. 1 is a front view of a panel showing an application example of a temperature abnormality detection device according to an embodiment of the present disclosure.
Figure 2:
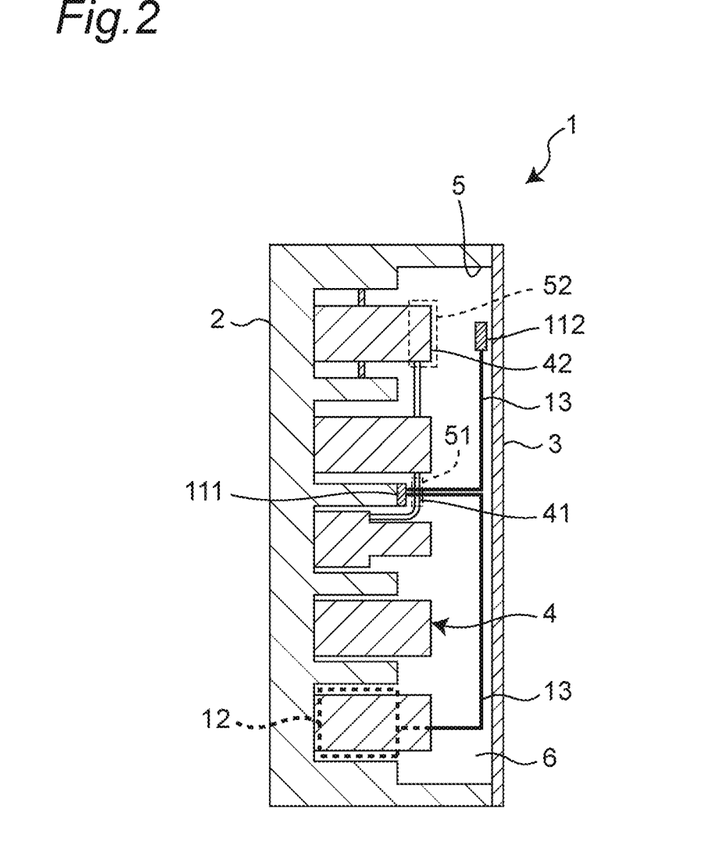
FIG. 2 is a cross-sectional view taken along a line II-II in FIG. 1.

A temperature abnormality detection device 10 according to an embodiment of the present disclosure is applicable to, for example, a panel 1 shown in FIG. 1. As shown in FIG. 2, the panel 1 includes a casing 2 having an opening 5, a cover 3 capable of opening and closing the opening 5, and equipment 4 disposed in the casing 2. In FIG. 1, the cover 3 and crossover wiring 13 to be described later are not shown.

As an example, the casing 2 has an approximately cuboid shape, and the opening 5 has an approximately rectangular shape. As shown in FIG. 2, a housing part 6 is provided inside the casing 2. The equipment 4 and the temperature abnormality detection device 10 are housed in the housing part 6. The casing 2 and the cover 3 are made of a magnetic material, for example.

As shown in FIG. 1 and FIG. 2, the temperature abnormality detection device 10 includes a plurality of infrared temperature sensors (in this embodiment, a first infrared temperature sensor 111 and a second infrared temperature sensor 112) and a device body 12.

As shown in FIG. 2, each of the infrared temperature sensors 111, 112 is disposed to be capable of detecting temperature in a mutually different detection area 51, 52 of the equipment 4. The infrared temperature sensors 111, 112 are connected to each other by the crossover wiring 13.

Specifically, the first infrared temperature sensor 111 disposed near the device body 12 is attached to the casing 2 to be capable of detecting temperature of wiring 41 connecting components in the equipment 4. The second infrared temperature sensor 112 disposed away from the device body 12 is attached to the cover 3 to be capable of detecting temperature of a surface of the equipment 4 facing the cover 3. The first infrared temperature sensor 111 is connected to the device body 12 and a power supply 101 by the crossover wiring 13. Further, the second infrared temperature sensor 112 is connected to the first infrared temperature sensor 111 by the crossover wiring 13.

Although not shown, each of the infrared temperature sensors 111, 112 includes, as an example, a lens of an optical system, a temperature conversion element, an AD converter, a temperature correction unit, and a communication unit. The temperature conversion element converts an infrared ray emitted from the detection area through the lens into a temperature. The AD converter converts the converted temperature (analog signal) into a digital signal, and the correction unit corrects an error generated when the converted temperature is converted into the digital signal. One end of wiring is connected to the communication unit. The digital signal converted by the AD converter is output from the communication unit to the device body 12 through the wiring.

Each of the detection areas 51, 52 is preset depending on, for example, a design of the equipment 4. According to this embodiment, as an example, the first detection area 51 of the first infrared temperature sensor 111 includes the wiring 41 connecting the components in the equipment 4, and the second detection area 52 of the second infrared temperature sensor 112 includes a portion 42 of the surface of the equipment 4 facing the cover 3.

As an example, the device body 12 includes a processor such as a CPU that performs computation and the like, a storage medium such as a ROM or a RAM that stores a program or data necessary for detecting a temperature abnormality in the detection areas 51, 52, and a communication unit responsible for input and output of signals from and to a programmable logic controller (PLC) 100 and the infrared temperature sensors 111, 112.

Figure 3:
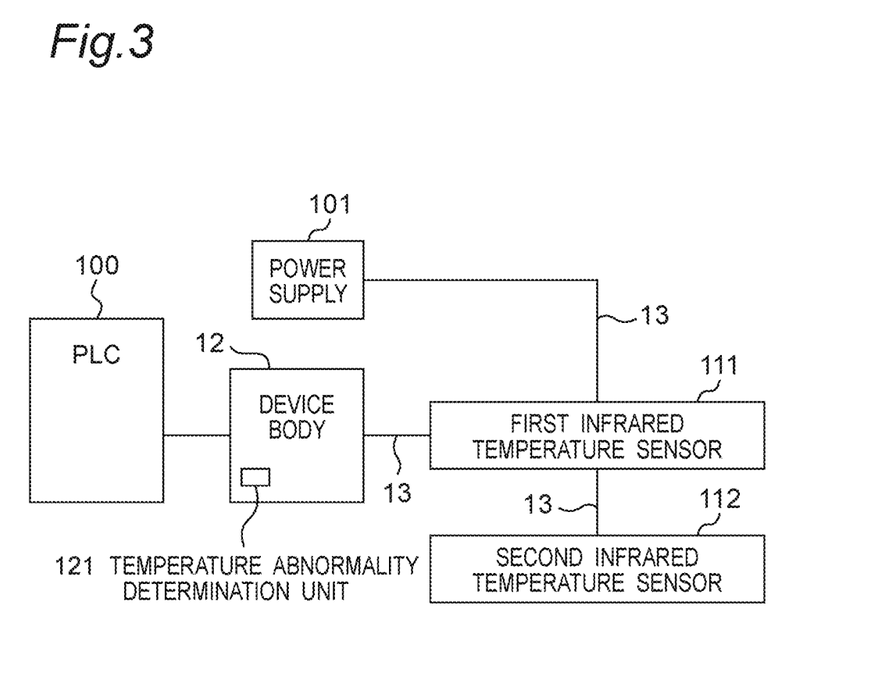
FIG. 3 is a block diagram showing a structure of the temperature abnormality detection device according to the embodiment of the present disclosure.

Specifically, as shown in FIG. 3, the device body 12 includes a temperature abnormality determination unit 121. For example, the temperature abnormality determination unit 121 is a function implemented by the processor of the device body 12 executing a predetermined program.

The temperature abnormality determination unit 121 determines that the temperature in the detection areas 51, 52 is abnormal when the temperature in the detection areas 51, 52 detected by each of the infrared temperature sensors 111, 112 is higher than a reference temperature. The reference temperature is preset depending on for example, the equipment 4 and the detection areas 51, 52. According to this embodiment, when it is determined that a temperature in each of the detection areas 51, 52 is abnormal, the temperature abnormality determination unit 121 outputs to the PLC 100 a temperature abnormality signal indicating that the temperature in each of the detection areas 51, 52 is abnormal.

A connection between the device body 12 and the PLC 100 may be radio connection or wire connection.

Each of the infrared temperature sensors 111, 112 will be described in more detail with reference to FIG. 4 to FIG. 6. The first infrared temperature sensor 111 and the second infrared temperature sensor 112 are identical to each other in size and shape. Therefore, a description of the second infrared temperature sensor 112 will be omitted by a support of the description of the first infrared temperature sensor 111.

Figure 4:
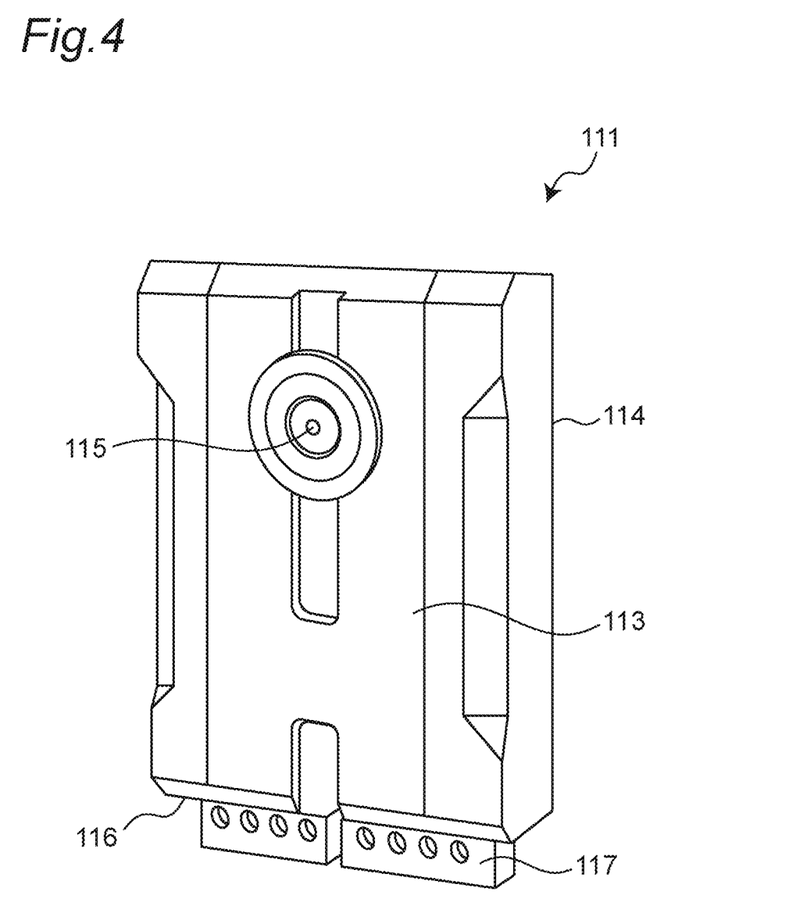
FIG. 4 is a perspective view of an infrared temperature sensor of the temperature abnormality detection device shown in FIG. 3.

As shown in FIG. 4, the first infrared temperature sensor 111, which has an approximately rectangular plate shape, includes a detection surface 113 on which a temperature detector 115 is provided, an attachment surface 114 attachable to and detachable from an inner surface of the panel 1 (that is, the casing 2 and the cover 3), and a connection surface 116 to which the crossover wiring 13 is connected. The detection surface 113 and the attachment surface 114 are arranged side by side in a thickness direction of the first infrared temperature sensor 111. The connection surface 116 extends in a direction intersecting the detection surface 113 and the attachment surface 114. The connection surface 116 is provided with a connection terminal 117 to which the crossover wiring 13 can be connected.

Figure 5:
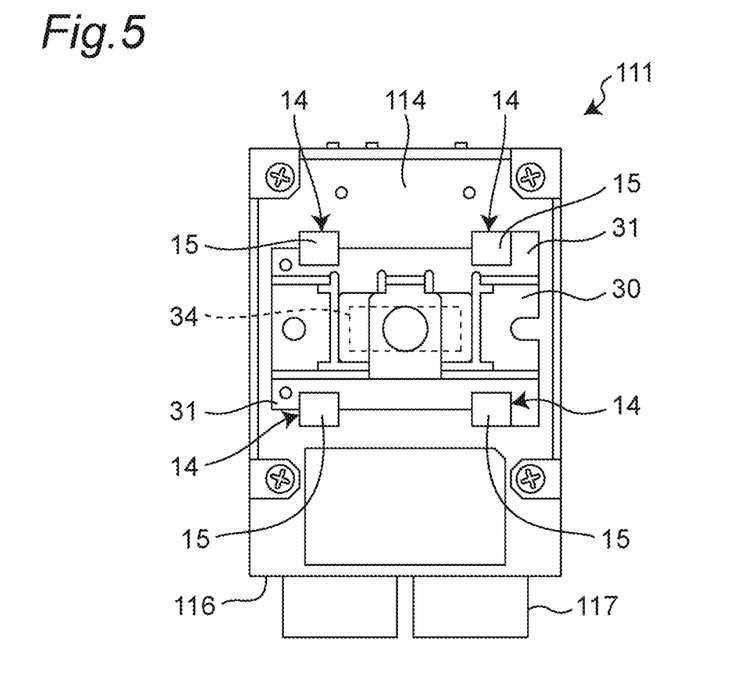
FIG. 5 is a first rear view of the infrared temperature sensor of the temperature abnormality detection device shown in FIG. 3.
Figure 6:
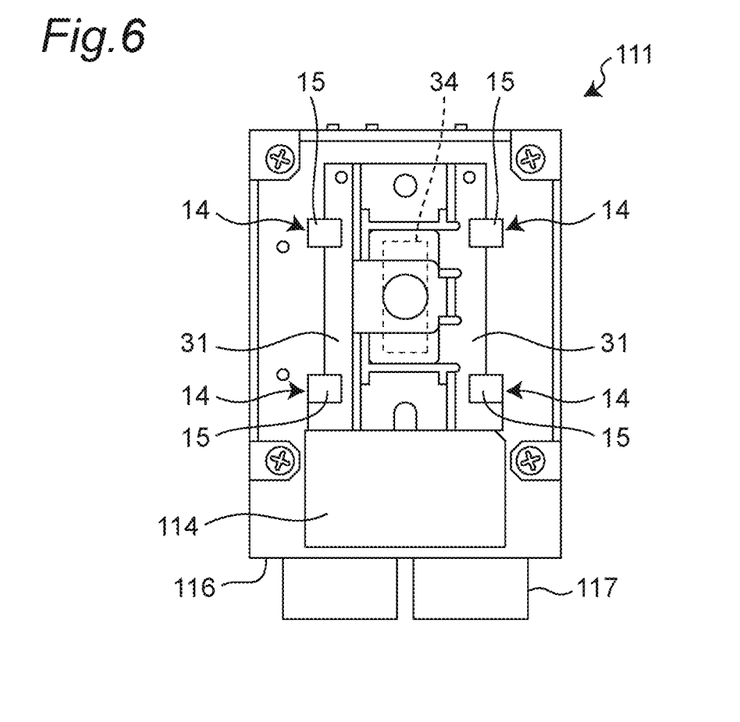
FIG. 6 is a first rear view of the infrared temperature sensor of the temperature abnormality detection device shown in FIG. 3.

In the temperature abnormality detection device 10, the attachment surface 114 of the first infrared temperature sensor 111 and the inner surface of the panel 1 are connected by an attachment fitting 30 shown in FIG. 5 and FIG. 6. In other words, the temperature abnormality detection device 10 further includes the attachment fitting 30 that detachably attaches the attachment surface 114 of the first infrared temperature sensor 111 to the inner surface of the panel 1.

The attachment fitting 30, which has an approximately rectangular plate shape, includes a pair of rail portions 31 extending in parallel along a length direction of the attachment fitting 30. The attachment surface 114 is provided with a rail attachment portion 14 to which the pair of rail portions 31 can be attached. The rail attachment portion 14 is configured by four locking portions 15 provided at four corners of the attachment surface 114. Each of the locking portions 15 is disposed capable of insetting the attachment fitting 30 between the adjacent rail attachment portions 14 and disposed to provide a gap between the locking portions 15 and the attachment surface 114. When the pair of rail portions 31 is disposed between each locking portion 15 and the attachment surface 114, a part of the pair of rail portions 31 is locked in a direction intersecting the attachment surface 114 by each locking portion 15 to be attached to the rail attachment portion 14.

As shown in FIG. 5, the attachment fitting 30 is attachable to the attachment surface 114 with its length direction extending in a width direction of the attachment surface 114. As shown in FIG. 6, the attachment surface 114 is also attachable with its length direction extending in a length direction of the attachment surface 114.

A permanent magnet 32 is provided between the pair of rail portions 31. The attachment fitting 30 is detachably attached to the inner surface of the panel 1 by the permanent magnet 32.

In the temperature abnormality detection device 10, the plurality of infrared temperature sensors 111, 112 are connected to each other by the crossover wiring 13. With such a configuration, an amount of wiring in the panel 1 can be reduces. Thus, it is possible to realize the temperature abnormality detection device 10 that is compact in size and is capable of detecting a temperature abnormality over a wide range. With such a configuration, an infrared temperature sensor can be added easily.

The first infrared temperature sensor 111 includes the attachment surface 114 attachable to and detachable from the inner surface of the panel 1, and the connection surface 116 that extends in a direction intersecting the attachment surface 114 and to which the crossover wiring 13 is connected. With such a configuration, a thickness of the first infrared temperature sensor 111 can be reduced. Accordingly, when the first infrared temperature sensor 111 is attached to the inner surface of the panel 1, a distance between the first infrared temperature sensor 111 and the detection area 51 is secured, so that a range, where the first infrared temperature sensor 111 can detect temperature, can be widened.

The temperature abnormality detection device 10 further includes the attachment fitting 30 that detachably attaches the attachment surface 114 of the first infrared temperature sensor 111 to the inner surface of the panel 1. The attachment fitting 30 includes the pair of rail portions 31 extending in parallel, and the attachment surface 114 includes the rail attachment portion 14 to which the pair of rail portions 31 is attachable. With such a configuration, a position where the attachment fitting 30 is attached to the attachment surface 114 can be easily changed depending on, for example, a place where the first infrared temperature sensor 111 is disposed. Thus, the first infrared temperature sensor 111 can be easily attached to the inner surface of the panel 1.

The attachment fitting 30 further includes the permanent magnet 32 and is attached to the inner surface of the panel 1 by the permanent magnet 32. With such a configuration, the first infrared temperature sensor 111 can be easily attached to even a position where, for example, mechanical fixing such as by a screw is difficult.

As long as each of the infrared temperature sensors 111, 112 can detect temperature in the mutually different detection area 51, 52 of the equipment 4, the infrared temperature sensors 111, 112 can have any shape and structure. For example, each of the infrared temperature sensors 111, 112 may have a shape other than an approximately cuboid shape, and may be attached to the inner surface of the panel 1 by a fastening member such as an adhesive or a screw instead of the attachment fitting 30.

Figure 7:
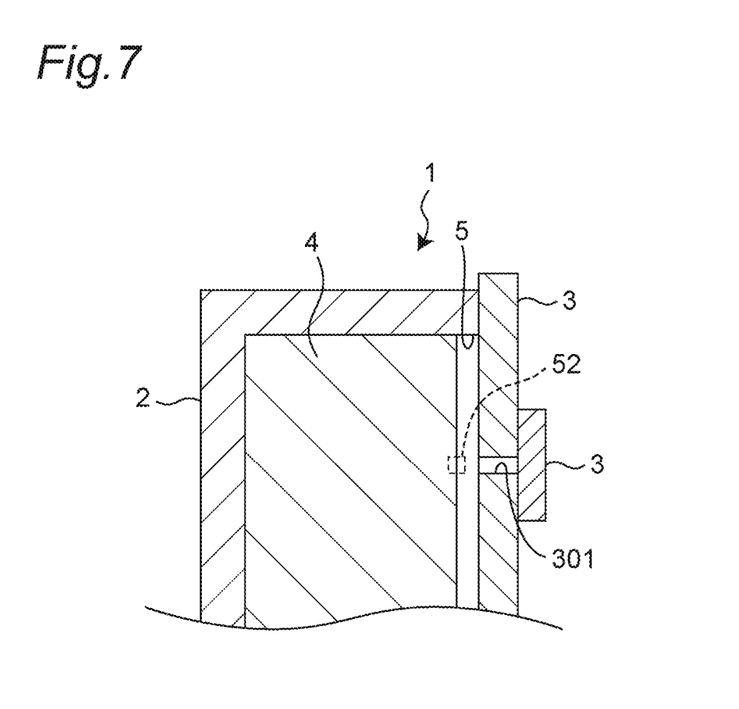
FIG. 7 is a partial cross-sectional view of a modification of the temperature abnormality detection device shown in FIG. 3.

As shown in FIG. 7, each of the infrared temperature sensors 111, 112 may be disposed not only inside the panel 1 but also outside the panel 1. The temperature abnormality detection device 10 shown in FIG. 7 is configured that the second infrared temperature sensor 112 detects the temperature in the second detection area 52 via a through hole 301 provided through the cover 3. With such a configuration, each of the infrared temperature sensors 111, 112 can be disposed at a position where a temperature abnormality in the detection area can be detected with higher reliability.

When each of the infrared temperature sensors 111, 112 is positioned, a camera (not shown) may be used. In this case, for example, the camera is configured to image the detection areas 51, 52, and includes the rail attachment portion 14 to which the attachment fitting 30 is attachable, as with the infrared temperature sensors 111, 112. The positioning of each of the infrared temperature sensors 111, 112 using the camera is made as follows. First, the attachment fitting 30 is attached to the camera. Then, the camera is moved to a detection position where the detection areas 51, 52 for detecting temperature is included in an imaging area of the camera. When the camera is moved to the detection position, the camera is removed from the attachment fitting 30 without moving the attachment fitting 30 from the detection position, and each of the infrared temperature sensors 111, 112 is attached to the attachment fitting 30. As a result, each infrared temperature sensor 111 is positioned at the detection position. That is, the infrared temperature sensors 111, 112 can be accurately positioned using the camera without using the infrared temperature sensors 111, 112 having a camera built therein.

Although the various embodiments of the present disclosure have been described in detail with reference to the drawings, a description will be given in conclusion of various aspects of the present disclosure. Note that the following description will be given as an example with the reference numerals attached.

A temperature abnormality detection device 10 according to a first aspect of the present disclosure that detects a temperature abnormality in equipment 4 disposed in a panel 1 includes:

a plurality of infrared temperature sensors 111, 112 each capable of detecting temperature in a mutually different detection area 51, 52 of the equipment 4; and a device body 12 including a temperature abnormality determination unit 121 that determines that the temperature in the detection are 51, 52 detected by each of the plurality of infrared temperature sensors 111, 112 is abnormal when the temperature in the detection area 51, 52 is higher than a reference temperature, wherein the plurality of infrared temperature sensors 111, 112 is connected to each other by crossover wiring 13.

According to the temperature abnormality detection device 10 of the first aspect, the plurality of infrared temperature sensors 111, 112 is connected to each other by the crossover wiring 13. With such a configuration, an amount of wiring in the panel 1 can be reduces. Thus, it is possible to realize the temperature abnormality detection device 10 that is compact in size and is capable of detecting a temperature abnormality over a wide range. With such a configuration, an infrared temperature sensor can be added easily.

In a temperature abnormality detection device 10 according to a second aspect of the present disclosure, the plurality of infrared temperature sensors 111, 112 includes a first infrared temperature sensor 111 disposed in the panel 1 and capable of detecting the temperature in the first detection area 51, and the first infrared temperature sensor 111 includes an attachment surface 114 attachable to and detachable from an inner surface of the panel 1 and a connection surface 116 to which the crossover wiring 13 is connected, the connection surface 116 extending in a direction intersecting the attachment surface 114.

According to the temperature abnormality detection device 10 of the second aspect, a thickness of the first infrared temperature sensor 111 can be reduced. Accordingly, when the first infrared temperature sensor 111 is attached to the inner surface of the panel 1, a distance between the first infrared temperature sensor 111 and the detection area 51 is secured, so that a range, where the first infrared temperature sensor 111 can detect temperature, can be widened.

A temperature abnormality detection device 10 according to a third aspect of the present disclosure further includes an attachment fitting 30 that detachably attaches the attachment surface 114 of the first infrared temperature sensor 111 to the inner surface of the panel 1, wherein the attachment fitting 30 includes a pair of rail portions 31 extending in parallel, and the attachment surface 114 includes a rail attachment portion 14 to which the pair of rail portions 31 is attached.

According to the temperature abnormality detection device 10 of the third aspect, a position where the attachment fitting 30 is attached to the attachment surface 114 can be easily changed depending on, for example, a place where the first infrared temperature sensor 111 is disposed. Thus, the first infrared temperature sensor 111 can be easily attached to the inner surface of the panel 1.

A temperature abnormality detection device 10 according to a fourth aspect of the present disclosure further includes a camera capable of imaging the detection area 51, 52, wherein the attachment fitting 30 is configured to attach any one of the plurality of infrared temperature sensors 111, 112 or the camera to the inner surface of the panel 1.

According to the temperature abnormality detection device 10 of the fourth aspect, each of the infrared temperature sensors 111, 112 can be accurately positioned using the camera, without using infrared temperature sensors 111, 112 each having a camera built therein.

In a temperature abnormality detection device 10 according to a fifth aspect of the present disclosure, the attachment fitting 30 has a permanent magnet 32 and is attached to the inner surface of the panel 1 by the permanent magnet 32.

According to the temperature abnormality detection device 10 of the fifth aspect, the first infrared temperature sensor 111 can be easily attached to even a position where, for example, mechanical fixing such as by a screw is difficult.

In a temperature abnormality detection device 10 according to a sixth aspect of the present disclosure, at least one of the plurality of infrared temperature sensors 111, 112 is disposed capable of detecting outside the panel 1 the temperature in the detection area 51, 52 via a through hole 301 of the panel 1.

According to the temperature abnormality detection device 10 of the sixth aspect, each of the infrared temperature sensors 111, 112 can be disposed at a position where a temperature abnormality in the detection area can be detected with higher reliability.

Note that suitably combining any of the various embodiments or any of the various modifications makes it possible to achieve effects possessed by each of the embodiments or the modifications. Further, combinations of the embodiments, combinations of the modifications, or combinations of the embodiments and the modifications are possible, and combinations of features in different embodiments or modifications are also possible.

While the present disclosure has been fully described in connection with the preferred embodiments with reference to the accompanying drawings, it will be apparent to those skilled in the art that various changes and modifications may be made. Unless such changes and modifications depart from the scope of the present disclosure as set forth in the accompanying claims, the changes and modifications should be construed as being included within the scope of the present disclosure.

INDUSTRIAL APPLICABILITY

The temperature abnormality detection device according to the present disclosure is applicable to, for example, a control panel, a distribution panel, or a high-voltage power receiving panel.

REFERENCE SIGNS LIST 1. panel
2. casing
3. cover
4. equipment
41. wiring
5. opening
6. housing part
10. temperature abnormality detection device
111. first infrared temperature sensor
112. second infrared temperature sensor
113. detection surface
114. attachment surface
115. temperature detector
116. connection surface
117. connection terminal
12. device body
121. temperature abnormality determination unit
13. crossover wiring
14. rail attachment portion
15. locking portion
30. attachment fitting
31. rail portion
32. permanent magnet
51. first detection area
52. second detection area
100. PLC
101. power supply

The invention claimed is:

1. A temperature abnormality detection device configured to detect a temperature abnormality in equipment positioned in a panel, comprising:
    a plurality of infrared temperature sensors each configured to detect temperature in a mutually different detection area of the equipment; and
    a device body including a temperature abnormality determination unit configured to determine that the temperature in the detection area detected by each of the plurality of infrared temperature sensors is abnormal when the temperature in the detection area is higher than a reference temperature, wherein
    the plurality of infrared temperature sensors is connected to each other by crossover wiring,
    the plurality of infrared temperature sensors includes a first infrared temperature sensor positioned in the panel and configured to detect the temperature in the first detection area, and
    the first infrared temperature sensor includes an attachment surface attachable to and detachable from an inner surface of the panel, a connection surface extending in a direction intersecting the attachment surface, and a detection surface including a temperature detector and extending along the attachment surface, the connection surface being provided with a connection terminal to which the crossover wiring is connected and extending in a direction intersecting the detection surface and the attachment surface.

2. The temperature abnormality detection device according to claim 1, further comprising an attachment fitting that detachably attaches the attachment surface of the first infrared temperature sensor to the inner surface of the panel, wherein the attachment fitting includes a pair of rail portions extending in parallel, and the attachment surface includes a rail attachment portion to which the pair of rail portions is attached.

3. The temperature abnormality detection device according to claim 2, further comprising a camera configured to image the detection area, wherein the attachment fitting is configured to attach any one of each of the plurality of infrared temperature sensors and the camera to the inner surface of the panel.

4. The temperature abnormality detection device according to claim 3, wherein the attachment fitting includes a permanent magnet and is attached to the inner surface of the panel by the permanent magnet.

5. The temperature abnormality detection device according to claim 2, wherein the attachment fitting includes a permanent magnet and is attached to the inner surface of the panel by the permanent magnet.

6. The temperature abnormality detection device according to claim 2, wherein at least one of the plurality of infrared temperature sensors is positioned to detect outside the panel the temperature in the detection area via a through hole of the panel.

7. The temperature abnormality detection device according to claim 1, wherein at least one of the plurality of infrared temperature sensors is positioned to detect outside the panel the temperature in the detection area via a through hole of the panel.

8. A temperature abnormality detection device configured to detect a temperature abnormality in equipment positioned in a panel, comprising:

a plurality of infrared temperature sensors each configured to detect temperature in a mutually different detection area of the equipment, wherein the plurality of infrared temperature sensors is connected to each other by crossover wiring, the plurality of infrared temperature sensors includes a first infrared temperature sensor positioned in the panel and configured to detect the temperature in the first detection area, and the first infrared temperature sensor includes an attachment surface attachable to and detachable from an inner surface of the panel, a connection surface extending in a direction intersecting the attachment surface, and a detection surface including a temperature detector and extending along the attachment surface, the connection surface being provided with a connection terminal to which the crossover wiring is connected and extending in a direction intersecting the detection surface and the attachment surface.

9. The temperature abnormality detection device according to claim 8, wherein the plurality of infrared temperature sensors includes a second first infrared temperature sensor which is connected to the first infrared temperature sensor by the crossover wiring, the first infrared temperature sensor being connected to a power supply.

10. The temperature abnormality detection device according to claim 9, comprising a device body including a communication unit, the device body being connected to the first infrared temperature sensor via the communication unit, wherein the device body is configured to output a temperature abnormality signal indicating that the temperature in each of the mutually detection area is abnormal.

11. The temperature abnormality detection device according to claim 10, further comprising an attachment fitting that detachably attaches the attachment surface of the first infrared temperature sensor to the inner surface of the panel, wherein the attachment fitting includes a pair of rail portions extending in parallel, and the attachment surface includes a rail attachment portion to which the pair of rail portions is attached.

12. The temperature abnormality detection device according to claim 11, further comprising a camera configured to image the detection area, wherein the attachment fitting is configured to attach any one of each of the plurality of infrared temperature sensors and the camera to the inner surface of the panel.

13. The temperature abnormality detection device according to claim 12, wherein the attachment fitting includes a permanent magnet and is attached to the inner surface of the panel by the permanent magnet.

14. The temperature abnormality detection device according to claim 11, wherein the attachment fitting includes a permanent magnet and is attached to the inner surface of the panel by the permanent magnet.

15. The temperature abnormality detection device according to claim 11, wherein at least one of the plurality of infrared temperature sensors is positioned to detect outside the panel the temperature in the detection area via a through hole of the panel.

16. The temperature abnormality detection device according to claim 10, wherein at least one of the plurality of infrared temperature sensors is positioned to detect outside the panel the temperature in the detection area via a through hole of the panel.

* * * * *